Jan. 3, 1956  C. E. FORKEL  2,729,548
PEBBLE HEAT EXCHANGE CHAMBER
Filed Sept. 8, 1952  2 Sheets-Sheet 2

INVENTOR.
C. E. FORKEL
BY Hudson and Young
ATTORNEYS

United States Patent Office 2,729,548
Patented Jan. 3, 1956

2,729,548

PEBBLE HEAT EXCHANGE CHAMBER

Curt E. Forkel, Bartlesville, Okla., assignor to Phillips Petroleum Company, a corporation of Delaware Application September 8, 1952, Serial No. 308,379

9 Claims. (Cl. 23—284)

This invention relates to pebble heater apparatus. In one of its more specific aspects, it relates to improved pebble heat exchange chambers of pebble heater apparatus. In another of its more specific aspects, it relates to means for obtaining more uniform pebble temperatures in a reactor chamber of pebble heater apparatus. In another of its more specific aspects, it relates to means for quenching reaction products in pebble heater apparatus. In another of its more specific aspects, it relates to means for obtaining more nearly equal pebble-gas contact time through reaction chambers.

Apparatus of the so-called "pebble heater" type has been utilized in recent years for the purpose of heating fluid to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene and acetylene, as well as for other reactions and purposes. Conventional pebble heater type apparatus includes two refractory-lined contacting chambers disposed one above the other and connected by a refractory-lined passageway or pebble throat of relatively narrow cross-section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form having strength which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to about one inch in diameter. In a high temperature process, pebbles having a diameter of between ¼ inch and ⅜ inch are preferred. The pebbles must be formed of refractory material which will withstand the temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to temperatures generally in the range of 1400° F. to 3200° F. The hot pebbles are thereafter contacted with the fluid to be superheated or reacted, as the case may be, in the other chamber. Generally, pebble inlet temperatures in the second chamber are about 50° F. to 200° F. below the highest temperature of the pebbles within the first chamber. In processes for the production of ethylene from light hydrocarbons, such as ethane or propane, the pebble temperature in the reaction chamber is usually in the range of 1200° F. to 1800° F. For the production of acetylene by pyrolysis of hydrocarbons, temperatures in the range of 1600° F. to 3000° F. are desirable.

One disadvantage of conventional reaction chambers of pebble heater apparatus is that pebbles tend to become stratified within the reactor at different temperatures. One cause of this stratification is the fact that pebbles which are introduced into the upper end portion of the reactor chamber tend to form a bed, the top of which is in the form of one or more cones depending upon whether one or more inlet conduits is utilized. The pebbles flow downwardly and away from the pebble conduit forming the above discussed conical top of the pebble bed. Gaseous material flowing upwardly through the gravitating bed of pebbles contact the pebbles forming the top of the bed at all points along the rolling path of the pebbles on top of the bed. This contact of the pebbles with the gas results in the lowering of the temperature of pebbles which finally reach the low portion of the conical bed section at a temperature materially below that of the pebbles which flow directly downward along a prolongation of the pebble axis of the pebble conduit.

Another disadvantage in the operation of conventional pebble heater apparatus is that the products tend to become overcracked before they can be removed from the reactor chamber. My invention substantially obviates those difficulties hereinbefore discussed.

Each of the objects of this invention is obtained by at least one of the aspects of this invention.

An object of this invention is to provide improved means for thermally treating or reacting gaseous materials. Another object of the invention is to provide improved means for obtaining pebbles at a more uniform temperature in a reactor chamber of pebble heater apparatus. Another object of the invention is to provide improved means for obtaining more nearly uniform pebble-gas contact time in a reactor chamber of pebble heater apparatus. Another object of the invention is to provide a method for obtaining more uniform cracking of hydrocarbon materials in a pebble reactor chamber. Other and further objects of the invention will be apparent upon study of the accompanying disclosure.

Broadly speaking, this invention resides in the improvement in reactor chambers of pebble heater apparatus which comprises providing a dome in the upper end portion of the reactor chamber, the dome being provided with a plurality of pebble conduits therethrough adjacent the periphery of the chamber. The pebble conduits form the only passages through the dome, thereby preventing any material flow of gaseous material from the reaction zone upwardly through the dome. A central hollow core is provided in the reactor chamber and extends upwardly from the lower portion of that chamber to a point substantially adjacent the dome in the upper portion of that chamber. The central core is open in its upper end portion so as to permit the flow of gaseous materials thereinto. The lower end portion of the central core extends from the reactor chamber to a desired disposal point. Quench means are provided in the upper end of the hollow central core so as to lower the temperature of the reaction products immediately after the entry of these products into the hollow central core.

Better understanding of this invention will be obtained upon study of the diagrammatic drawings in which.

Figure 1:
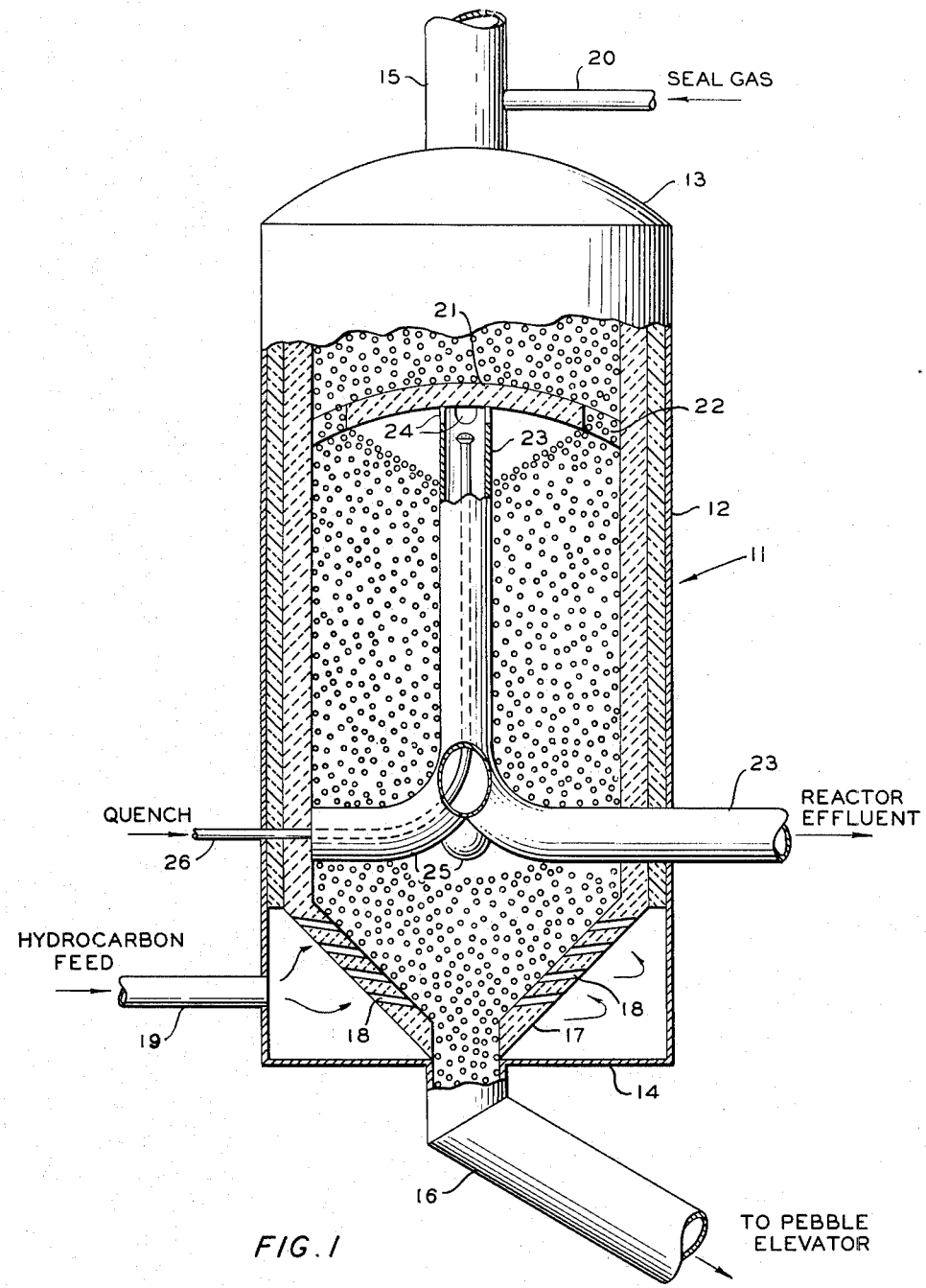
Figure 1 is a vertical section of a pebble heater chamber of this invention.

Referring particularly to the device shown in Figure 1 of the drawings, pebble heat exchange chamber 11 comprises upright, elongated shell 12 closed at its upper and lower ends by closure members 13 and 14, respectively. Pebble inlet conduit 15 is provided in the upper end portion of shell 12 and may be positioned coaxially with respect to chamber 11, as shown, or may be offset toward the periphery of that chamber, if desired. Pebble outlet conduit 16 extends downwardly from the lower end of chamber 11. Conical closure member 17 having gaseous material conduits 18 provided therethrough is spaced from shell 12 and closure member 14 so as to provide a gas distribution chamber in the lower end of chamber 11. Gaseous material inlet conduit 19 is connected to the gas distribution chamber formed between closure member 17, shell 12, and closure member 14. Dome 21 is provided in the upper end portion of chamber 11 and is supported at its periphery by shell 12. Pebble conduits 22 extend through dome 21 adjacent the periphery of the chamber and form the sole openings through the dome. Hollow core 23 extends upwardly and coaxially through chamber 11 from the bottom portion thereof to dome 21. Gas inlet openings 24 are provided in the upper end of core 23, adjacent dome 21 so as to admit gaseous materials into the interior of core 23 at points above the normal level of pebbles below dome 21. The lower end of core 23 extends outwardly through the wall of shell 12, core 23 thus forming a gaseous effluent conduit from a point adjacent dome 21 to the exterior of shell 12. The lower end of core 23, which extends outwardly through the wall of shell 12, forms one support member for supporting that core within chamber 11. Additional support members 25 extend from the lower end portion of core 23 to shell 12 providing additional support for core 23 in the lower portion of chamber 11. Quench conduit 26 extends through the wall of shell 12, through one of the support members 25, and upwardly through hollow core 23 to a point adjacent inlet conduits 24 in the upper end of core 23. A conventional spray head may be provided at the upper end of quench conduit 26. Conduit 20 is provided in pebble conduit 15 so as to provide inert gas to the pebble throat, thereby preventing the flow of other gases through that throat.

Referring particularly to the device shown as Figure 2 of the drawings, parts which are like those discussed in connection with Figure 1 are designated by like numerals. Pebble heat exchange chamber 27 comprises upright, elongated shell 28 closed at its upper and lower ends by closure members 29 and 31, respectively. A plurality of pebble outlet conduits 32 extend downwardly from the lower end of chamber 27 and are disposed on an annulus intermediate the axis and periphery of that chamber. Hollow central core 33 extends upwardly through the bottom of chamber 27, being coaxially disposed therewith, and to a point spaced below dome 21 but above the normal level of the pebbles within the chamber below dome 21. A plurality of conical closure members 34, provided with gaseous material conduits 35 extending therethrough are spaced from shell 28 and closure member 31 so as to provide a gas distribution chamber therebetween. Gaseous material inlet conduit 19 is connected to the gas distribution chamber so formed. Quench conduit 36 extends downwardly through the upper end portion of shell 28 and through dome 21 into the upper end of hollow core 33.

Figures 2, 3:
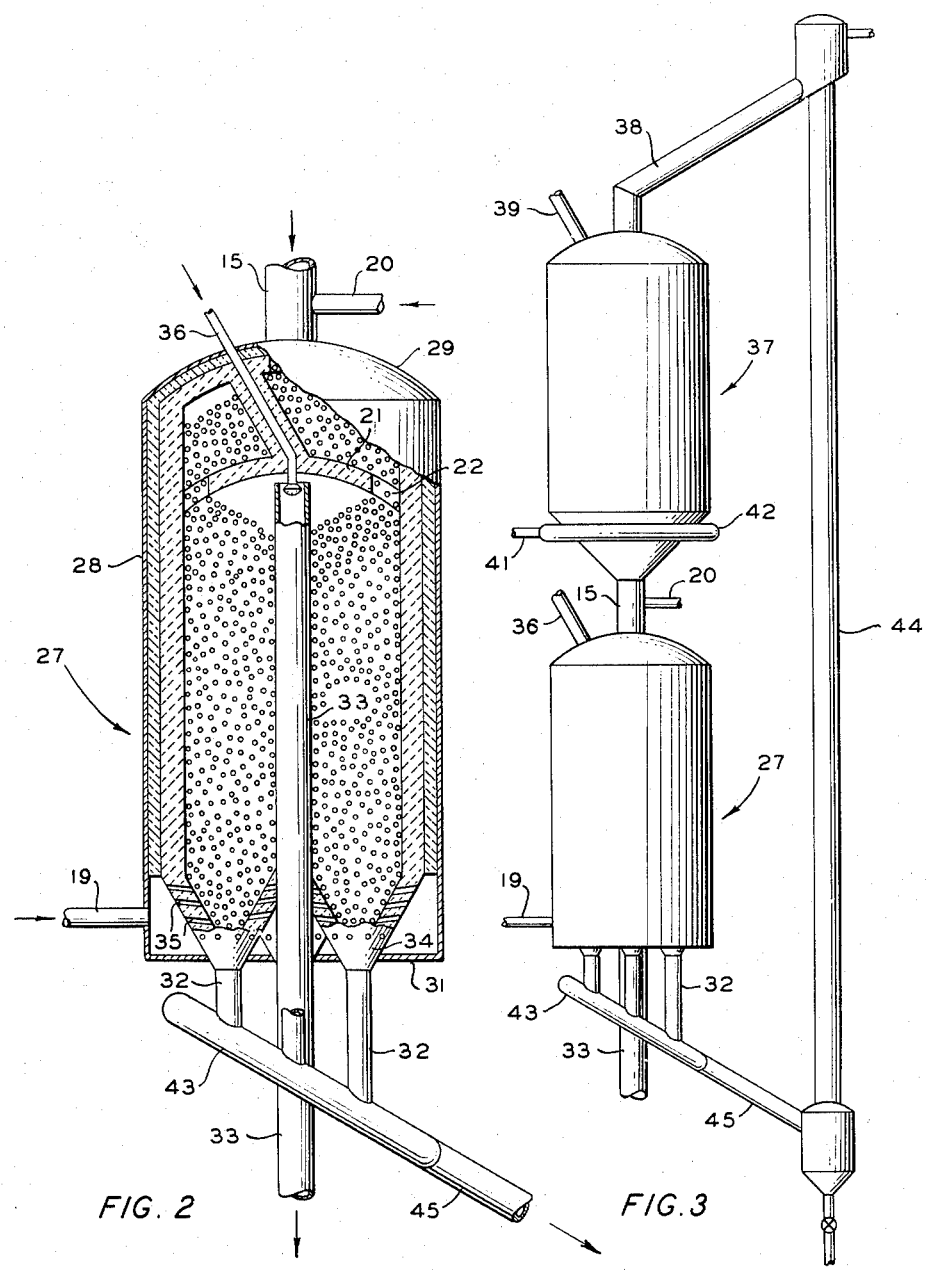
Figure 2 is a vertical section of a modification of the pebble heater chamber of this invention.
Figure 3 is a schematic view of a pebble heater apparatus.

Referring particularly to the device shown in Figure 3 of the drawings, pebble heater chamber 37 is provided with a pebble inlet conduit 38 in its upper end portion and gaseous effluent outlet conduit 39 also in its upper end portion. Gaseous material inlet conduit 41 is connected to the lower end of chamber 37, preferably through header member 42. Chamber 37 is connected at its lower end to the upper end of chamber 27 positioned therebelow, by means of conduit 15, which conduit is provided with a seal gas conduit 20 intermediate its ends. Gaseous material inlet conduit 19 extends into the lower end portion of shell 27, as discussed in connection with Figures 1 and 2 of the drawings. Pebble outlet conduits 32 extend downwardly from the lower end of chamber 27 and are connected at their lower ends to a header member 43 which is in turn connected to the lower end portion of an elevator 44 by means of conduit 45. The upper end portion of elevator 44 is connected to the upper end of pebble conduit 38. Quench conduit 36 extends downwardly into the upper end of hollow core 33, which hollow core extends downwardly through the lower end of chamber 27. Although Figure 3 is drawn so as to show the chamber of Figure 2, the chamber of Figure 1 can be used interchangeably with that chamber.

In the operation of the devices discussed in connection with Figure 1, 2, and 3 of the drawings, pebbles are introduced into the upper end portion of chamber 37 through pebble inlet conduit 38 and form a contiguous gravitating pebble mass within that chamber. Gaseous heating material is introduced into the lower portion of chamber 37 through conduit 41 and header member 42. The gaseous heating material may be preheated gases, or may be fuel and air which may be burned in the lower portion of chamber 37 to form hot combustion gases at a temperature at least as high as the temperature desired in reaction chamber 27. The hot gaseous heating material is passed upwardly through the gravitating pebble mass within chamber 37 raising the temperature of those pebbles to the desired temperature by direct heat exchange therewith. Gaseous effluent material is removed from the upper end of chamber 37 through effluent outlet conduit 39. Heated pebbles are gravitated through conduit 15 into the upper end portion of chamber 27. The chamber portion above dome 21 acts as a soaking zone wherein the pebbles are maintained in direct heat exchange with each other and arrive at a substantially uniform temperature. The pebbles are gravitated into the chamber formed below dome 21 through conduits 22, forming an annular contiguous gravitating pebble mass therein. Gaseous material which is to be heated or reacted within chamber 27 is introduced through conduit 19 into the gas distribution zone formed in the lower portion of that chamber and flow inwardly through conduits 35 into the gravitating pebble mass in that chamber and upwardly in direct heat exchange with those pebbles to the upper end portion of the chamber formed below dome 21. Gaseous effluent material is removed from the void space formed below dome 21 through hollow core 33 and a liquid quench material, such as water, is introduced into the upper end of core 33 so as to lower the temperature of the gaseous effluent material to a temperature at which further reaction is substantially stopped. The reaction products together with vaporized quench material are removed from the lower end of chamber 27 through hollow core 33. Pebbles are removed from the lower end of chamber 27 through conduits 32 and are transported by means of header member 43, conduit 45, and elevator 44 to pebble inlet conduit 38 through which the pebbles are once again introduced into the upper end portion of chamber 37. Any conventional type of elevator and pebble flow controller can be utilized in connection with this invention.

Various modifications of this invention will be apparent to those skilled in the art upon study of the accompany-

I claim:

1. An improved pebble heat exchange chamber comprising in combination a closed, upright, elongated shell; pebble inlet means in the upper end of said shell; pebble outlet means in the lower end of said shell; gaseous material inlet means in the lower end of said shell; and a hollow core centrally positioned within said shell, extending downwardly through said chamber from a point in the upper end portion of said chamber, and above the normal level of pebbles within said chamber to the exterior of the lower end portion of said chamber, said hollow core being open in its upper end section into said chamber above said normal level of pebbles to provide a flow path for gaseous effluent into said core.

2. An improved pebble heat exchange chamber comprising in combination a closed, upright, elongated shell; pebble inlet means in the upper end of said shell; pebble outlet means in the lower end of said shell; gaseous material inlet means in the lower end portion of said shell; a dome transversely disposed with respect to the chamber within said shell and supported at its periphery by said shell in the upper end portion of said chamber; pebble conduits extending through said dome adjacent the periphery of said chamber; and a hollow core centrally disposed within said chamber and extending downwardly through said chamber from a point adjacent said dome to the exterior of said shell, said hollow core being open in its end section adjacent said dome to said chamber to provide flow of gaseous effluent into said core.

3. The pebble heat exchange chamber of claim 2 wherein the lower end portion of said hollow core is curved and extends through the side wall of said shell; and a plurality of support members extends between the wall of said shell and the upright portion of said hollow core, said support members being uniformly distributed about said core.

4. The heat exchange chamber of claim 3 wherein a quench conduit extends into the upper end portion of said hollow core and is adapted to spray quench liquid across an entire cross section of said hollow core.

5. The pebble heat exchange chamber of claim 4 wherein said core is connected to the lower side of said dome and openings are provided in the upper end portion of said hollow core so as to admit gaseous material into the interior of said core.

6. The pebble heat exchange chamber of claim 5 wherein said quench conduit extends through one of said support members into said hollow core and upwardly to the upper end portion of said hollow core.

7. The pebble heat exchange chamber of claim 4 wherein said quench conduit extends through one of said support members into said hollow core and upwardly to the upper end portion of said hollow core.

8. An improved pebble heat exchange chamber comprising in combination a closed, upright, elongated shell; pebble inlet means in the upper end of said shell; a plurality of pebble outlet conduits in the lower end portion of said shell disposed intermediate the axis and periphery of said shell and equi-spaced about said chamber; gaseous material inlet means in the lower end portion of said shell; a dome transversely disposed with respect to chamber formed by said shell, supported at its periphery by said shell in the upper end portion of said chamber; pebble conduits extending through said dome adjacent its periphery and a hollow core, open in its upper end to gas flow, and extending downwardly through said chamber and centrally from a point adjacent said dome through the bottom of said shell; and quenching conduit means extending into the upper end of said hollow core.

9. The pebble heat exchange chamber of claim 8 wherein said quench conduit means extends through said shell and said dome into the upper end portion of said hollow core.

References Cited in the file of this patent

UNITED STATES PATENTS

| | | |
|---|---|---|
| 570,449 | Blodgett | Nov. 3, 1896 |
| 1,995,293 | Clark | Mar. 26, 1935 |
| 2,534,625 | Robinson | Dec. 19, 1950 |
| 2,541,548 | Robinson | Feb. 13, 1951 |
| 2,623,842 | Robinson | Dec. 30, 1952 |
| 2,673,791 | McIntire | Mar. 30, 1954 |